US010321233B2

United States Patent
Lan et al.

(10) Patent No.: US 10,321,233 B2
(45) Date of Patent: Jun. 11, 2019

(54) METHOD AND PORTABLE ELECTRONIC APPARATUS FOR ADAPTIVELY ADJUSTING PLAYBACK EFFECT OF SPEAKERS

(71) Applicants: Po-Yueh Lan, Taipei (TW); Chang-Yuan Wu, Taipei (TW); Yi-Chang Wu, Taipei (TW); Kun-Tien Kuo, Taipei (TW); Ya-Hui Tseng, Taipei (TW); Chen-Yi Huang, Taipei (TW); Chun-Yi Ho, Taipei (TW); Hsiao-Ching Hung, Taipei (TW)

(72) Inventors: Po-Yueh Lan, Taipei (TW); Chang-Yuan Wu, Taipei (TW); Yi-Chang Wu, Taipei (TW); Kun-Tien Kuo, Taipei (TW); Ya-Hui Tseng, Taipei (TW); Chen-Yi Huang, Taipei (TW); Chun-Yi Ho, Taipei (TW); Hsiao-Ching Hung, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/191,551

(22) Filed: Jun. 24, 2016

(65) Prior Publication Data

US 2017/0111739 A1     Apr. 20, 2017

Related U.S. Application Data

(60) Provisional application No. 62/184,878, filed on Jun. 26, 2015.

(51) Int. Cl.
*G06F 3/16*     (2006.01)
*H04R 1/24*     (2006.01)
(Continued)

(52) U.S. Cl.
CPC ............... *H04R 3/14* (2013.01); *G06F 3/165* (2013.01); *H04R 1/24* (2013.01); *H04R 1/2803* (2013.01);
(Continued)

(58) Field of Classification Search
CPC ........ G06F 3/0488; G06F 3/165; G06F 9/451; H04R 3/04; H04R 3/00; H04R 3/14;
(Continued)

(56) References Cited

U.S. PATENT DOCUMENTS

| 5,838,537 A | * | 11/1998 | Lundgren | ............. | G06F 1/1616 |
| | | | | | 361/679.27 |
| 2012/0082317 A1 | * | 4/2012 | Pance | .................... | H04R 7/045 |
| | | | | | 381/59 |

(Continued)

FOREIGN PATENT DOCUMENTS

| TW | M392514 | 11/2010 |
| TW | I372966 | 9/2012 |

OTHER PUBLICATIONS

"Office Action of Taiwan Counterpart Application," dated Sep. 30, 2017, p. 1-5.

*Primary Examiner* — Yogeshkumar Patel
(74) *Attorney, Agent, or Firm* — JCIPRNET

(57) ABSTRACT

A method and a portable electronic apparatus for adaptively adjusting a playback effect of speakers are provided. The portable electronic apparatus includes a speaker enclosure volume adjusting device and a processor coupled to the speakers and the speaker enclosure volume adjusting device. In the method, the processor detects a usage demand for the portable electronic apparatus and accordingly determines an audio mode. Based on the determined audio mode, the processor selects and activates multiple speakers, and adjusts an enclosure volume of at least one of the activated speakers, so as to change an audio frequency range of the at
(Continued)

least one speaker and an overall audio frequency range covered by the activated speakers. Finally, the processor plays an audio through the activated speakers.

14 Claims, 6 Drawing Sheets

(51) Int. Cl.
*H04R 1/28* (2006.01)
*H04R 3/04* (2006.01)
*H04R 3/12* (2006.01)
*H04R 3/14* (2006.01)
*H04R 5/02* (2006.01)

(52) U.S. Cl.
CPC .................. *H04R 3/04* (2013.01); *H04R 3/12* (2013.01); *H04R 5/02* (2013.01); *H04R 2205/022* (2013.01); *H04R 2430/01* (2013.01); *H04R 2499/11* (2013.01)

(58) Field of Classification Search
CPC .......... H04R 2499/11; H04R 2201/028; H04R 3/12; H04R 1/2803; H04R 5/02; H04R 1/24; H04R 1/2873; H04R 2205/021; H04R 2205/022; H04R 2430/01
USPC .......... 381/107, 56, 61, 345; 455/563, 569.1
See application file for complete search history.

(56) References Cited

U.S. PATENT DOCUMENTS

2014/0241702 A1   8/2014  Solbach et al.
2014/0341410 A1* 11/2014  Sim ...................... H04R 1/028
                                                            381/333

\* cited by examiner

METHOD AND PORTABLE ELECTRONIC APPARATUS FOR ADAPTIVELY ADJUSTING PLAYBACK EFFECT OF SPEAKERS

CROSS-REFERENCE TO RELATED APPLICATION

This application claims the priority benefits of U.S. provisional application Ser. No. 62/184,878, filed on Jun. 26, 2015. The entirety of the above-mentioned patent application is hereby incorporated by reference herein and made a part of this specification.

BACKGROUND

Field of the Invention

The invention is directed to a method and an apparatus for playing an audio and more particularly, to a method and a portable electronic apparatus for adaptively adjusting an audio effect of speakers.

Description of Related Art

At present, when a multi-channel technique is implemented on a notebook computer, a manner of using a stereophonic simulation effect or an operation by using a plurality of fixed speakers is commonly employed. In term of the stereophonic simulation effect, an effect allowing a user to experience a sound field can be achieved by means of mixing and calculating frequencies, which unfortunately results in weak and monotonous sound. The operation of the plurality of speakers uses fixed positions, such that when the user listens to music, an optimized effect is hard to be achieved due to the limitation in space utilization, and the quality of the speakers also cannot be changed to cope with usage demands for different users in different modes or scenarios.

SUMMARY

Accordingly, the invention provides a method and a portable electronic apparatus for adaptively adjusting a playback effect of speakers, capable of adaptively adjusting audio frequency ranges and audio quality of the speakers according to a usage demand.

According to an embodiment of the invention, a method for adaptively adjusting a playback effect of speakers applicable to a portable electronic apparatus having a plurality of speakers is provided. The portable electronic apparatus includes a speaker enclosure volume adjusting device and a processor coupled to the speakers and the speaker enclosure volume adjusting device. In the method, the processor detects a usage demand for the portable electronic apparatus, and accordingly determines an audio mode. Based on the audio mode, the processor selects and activates a plurality of the speakers, and adjusts an enclosure volume of at least one of the activated speakers by using the speaker enclosure volume adjusting device, so as to change an audio frequency range of the at least one speaker and an overall audio frequency range covered by the activated speakers. Finally, the processor plays an audio through the activated speakers.

In an embodiment of the invention, the step of the processor playing the audio through the activated speakers includes applying an audio setting corresponding to the audio mode to the activated speakers, and playing the audio through the activated speakers by the processor.

In an embodiment of the invention, the step of the processor detecting the usage demand for the portable electronic apparatus, and accordingly determining the audio mode includes detecting a trigger signal generated by a control key of the portable electronic apparatus in correspondence to an operation, and accordingly determining the audio mode.

In an embodiment of the invention, the step of the processor detecting the usage demand for the portable electronic apparatus, and accordingly determining the audio mode includes detecting a function currently being executed by the portable electronic apparatus, and accordingly determining the audio mode.

In an embodiment of the invention, the step of the processor detecting the usage demand for the portable electronic apparatus, and accordingly determining the audio mode includes detecting ambient noise surrounding the portable electronic apparatus by using an audio receiver, and accordingly determining the audio mode.

In an embodiment of the invention, the step of the processor selecting and activating the plurality of the speakers, and adjusting the enclosure volume of the at least one of the activated speakers by using the speaker enclosure volume adjusting device based on the audio mode, so as to change the audio frequency range of the at least one speaker and the overall audio frequency range covered by the activated speakers includes activating at least one tweeter and a woofer among the speakers, and adjusting the enclosure volume of the least one tweeter based on the audio mode, so as to change an audio frequency range of the at least one tweeter and an overall audio frequency range covered by the at least one tweeter and the woofer.

In an embodiment of the invention, the step of the processor selecting and activating the plurality of the speakers based on the audio mode includes executing a basic input/output system (BIOS), selecting and executing a corresponding audio driver in the audio mode through the BIOS, and activating the corresponding speakers through the audio driver.

In an embodiment of the invention, the step of the processor selecting and activating the plurality of the speakers based on the audio mode includes executing the audio driver to activate the corresponding speakers in the audio mode through the audio driver.

According to an embodiment of the invention, a portable electronic apparatus for adaptively adjusting a playback effect of speakers is provided. The portable electronic apparatus includes a plurality of speakers, a speaker enclosure volume adjusting device and a processor. Each of the speakers has an audio frequency range. The speaker enclosure volume adjusting device is used to adjust an enclosure volume of at least one of the activated speakers, so as to change an audio frequency range of at least one speaker. The processor is coupled to the speakers and the speaker enclosure volume adjusting device and configured to detect a usage demand for the portable electronic apparatus, so as to determine an audio mode, select and activate a plurality of the speakers, and adjust the enclosure volume of the at least one of the activated speakers by using the speaker enclosure volume adjusting device based on the audio mode, so as to change the audio frequency range of the at least one speaker and an overall audio frequency range covered by the activated speakers, and play an audio through the activated speakers.

In an embodiment of the invention, the processor applies an audio setting corresponding to the audio mode to the activated speakers, and plays the audio through the activated speakers.

In an embodiment of the invention, the portable electronic apparatus further includes a control key configured to receive an operation to generate a trigger signal, wherein the processor detects the trigger signal generated by the control key, and accordingly determines the audio mode.

In an embodiment of the invention, the processor detects a function currently being executed by the portable electronic apparatus, and accordingly determines the audio mode.

In an embodiment of the invention, the portable electronic apparatus further includes an audio receiver configured to detect ambient noise surrounding the portable electronic apparatus, wherein the processor determines the audio mode according to the ambient noise detected by the audio receiver.

In an embodiment of the invention, the speakers include at least one tweeter and a woofer, wherein the processor adjusts an enclosure volume of the at least one tweeter according to the audio mode, so as to change an audio frequency range of the at least one tweeter and an overall audio frequency range covered by the at least one tweeter and the woofer.

In an embodiment of the invention, the processor includes a digital signal processor (DSP).

In an embodiment of the invention, the processor executes a BIOS, and selects and executes a corresponding audio driver in the audio mode through the BIOS, so as to activate the corresponding speakers through the audio driver.

In an embodiment of the invention, the processor executes the audio driver to activate the corresponding speakers in the audio mode through the audio driver.

In an embodiment of the invention, one of the speakers has a control pin, and the processor has a detection pin corresponding thereto. When the speaker enclosure volume adjusting device adjusts the enclosure volume of the at least one of the activated speakers to enable the control pin to contact the detection pin, the detection pin generates and outputs a trigger signal to the processor, and the processor detects the trigger signal generated by the control key, so as to determine the audio mode.

To sum up, in the method and the portable electronic apparatus for adaptively adjusting the playback effect of the speakers, an adaptive audio mode is determined by detecting the usage demand for the portable electronic apparatus, the speakers are adaptively selected and activated, the audio frequency range of each of the activated speakers are adjusted, and the adaptive audio setting is applied, such that an effect of adaptively adjusting the audio frequency ranges and audio quality of the speakers can be achieved.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the invention, speakers of a portable electronic apparatus are designed in a form of expandable enclosure volumes for providing changeable audio frequency ranges. In actual application scenarios, an adaptive audio mode is determined by detecting different users' usage demands for the portable electronic apparatus. Thereby, speakers to be activated are selected, enclosure volumes of part of the speakers are adjusted to change an overall audio frequency range covered by the speakers, and an adaptive audio setting is additionally applied, such that an overall playback effect presented by the speakers meets to the users' usage demands.

Figure 1:
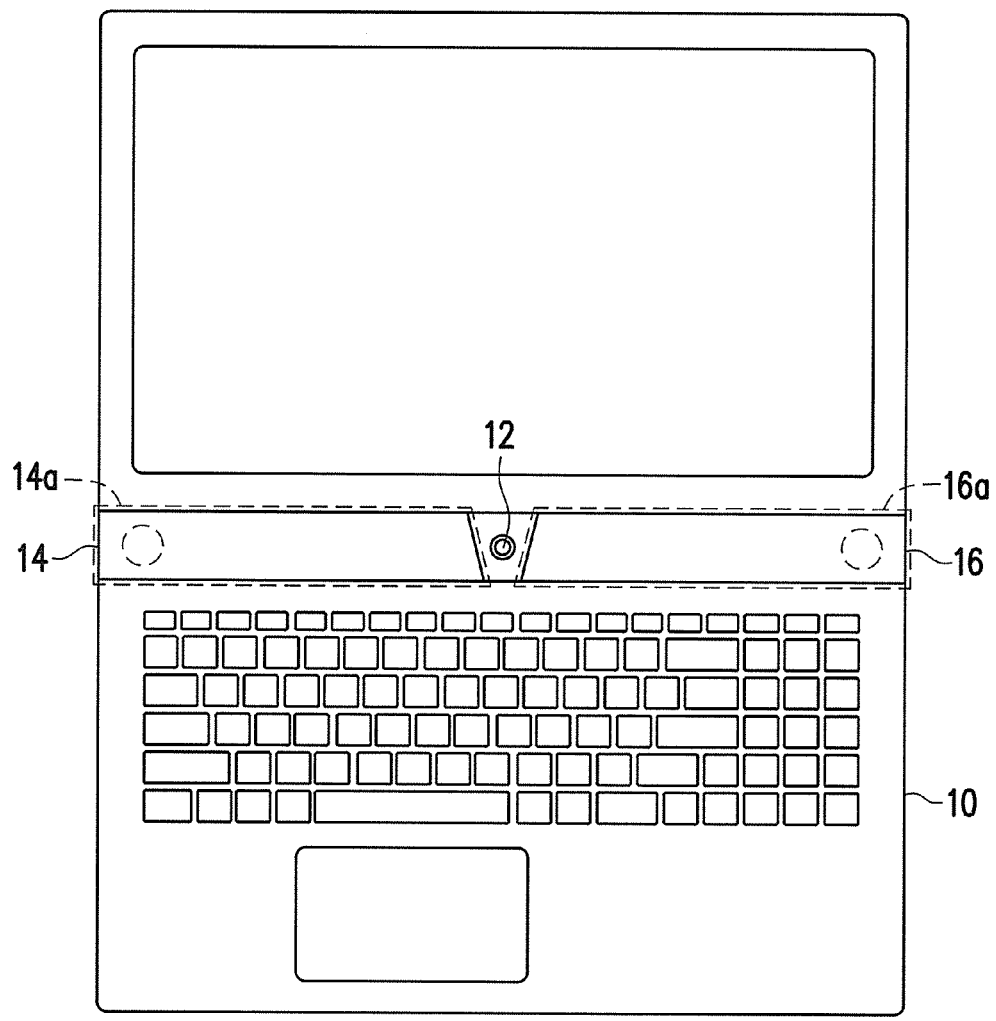
FIG. 1 is a schematic diagram illustrating a portable electronic device for adaptively adjusting a playback effect of speakers according to an embodiment of the present invention.
Figure 2:
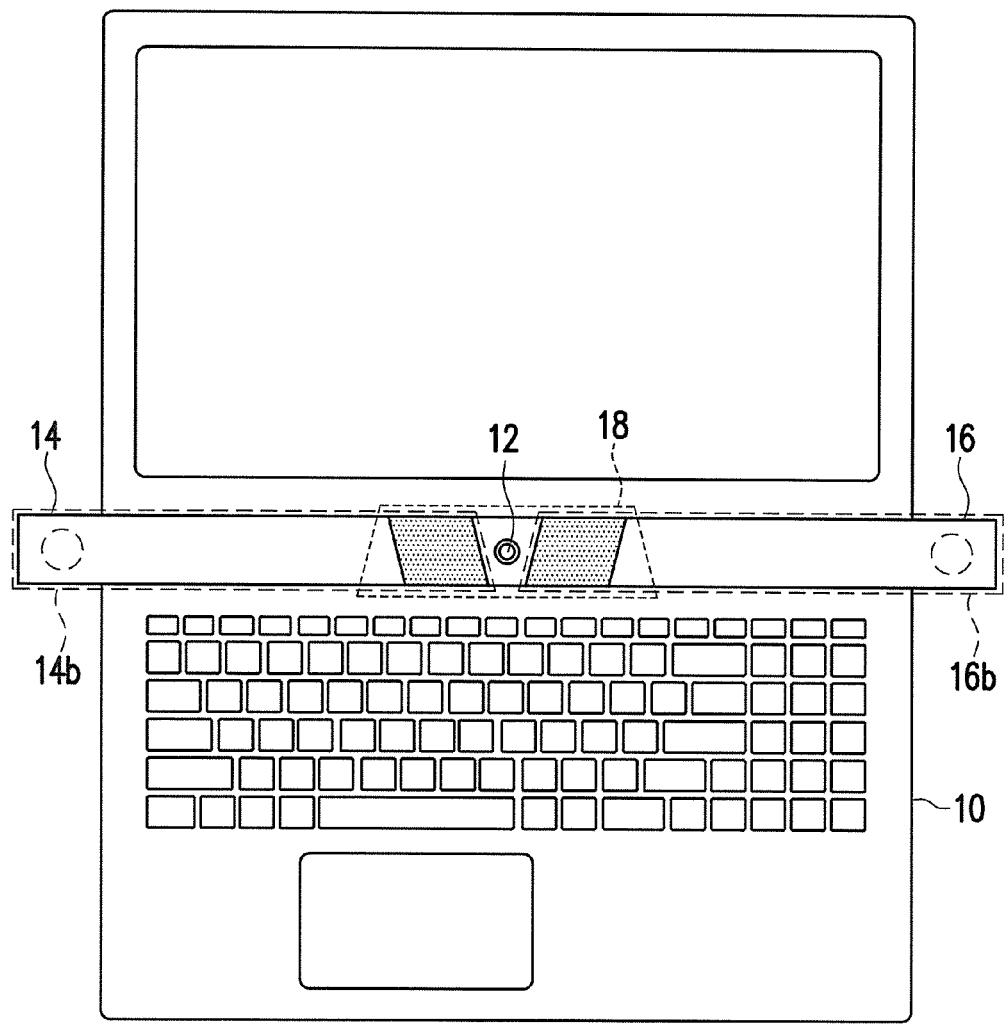
FIG. 2 is a schematic diagram illustrating a portable electronic device for adaptively adjusting a playback effect of speakers according to an embodiment of the present invention.

FIG. 1 and FIG. 2 are schematic diagrams illustrating a portable electronic device for adaptively adjusting a playback effect of speakers according to an embodiment of the present invention. Referring to both FIG. 1 and FIG. 2, a portable electronic apparatus 10 of the present embodiment is, for example, a notebook computer and includes a control key 12, tweeters 14 and 16 and a woofer 18. The tweeters 14 and 16 use a design with expandable enclosure volumes, and in a standard mode, the tweeters 14 and 16 are contained within a body range of the portable electronic apparatus 10 (as illustrated in FIG. 1). A user may activate a specific audio mode by pressing the control key 12. In the specific audio mode, the tweeters 14 and 16 are respectively slid out to protrude from two sides of the portable electronic apparatus 10 (as illustrated in FIG. 2).

Specifically, trails, for example, may be disposed underneath the tweeters 14 and 16, and when the user presses the control key 12, the tweeters 14 and 16 may be slid out from the two sides of the portable electronic apparatus 10 by means of being electrically driven or hydraulically driven by the portable electronic apparatus 10. Alternatively, the user may push or pull the tweeters 14 and 16 from the two sides of the portable electronic apparatus 10 by means of manually pushing or pulling.

It should be mentioned that enclosure volumes of the tweeters 14 and 16 increase along with the sliding. Specifically, in the standard mode, the tweeters 14 and 16 are contained within the body range of the portable electronic apparatus 10, and the enclosure volumes thereof merely cover areas 14a and 16a respectively labeled in FIG. 1. In the specific audio mode, since the tweeters 14 and 16 are slid out from the two sides of the portable electronic apparatus 10, and the enclosure volumes thereof are capable of being expanded to cover areas 14*b* and 16*b* labeled in FIG. 2, such that the audio frequency ranges covered by the tweeters 14 and 16 are changed. The woofer 18 is, for example, disposed underneath the tweeters 14 and 16 and exposed and activated along with the tweeters 14 and 16 sliding out from the two sides of the portable electronic apparatus 10 to provide a bass playback effect.

The invention applies the aforementioned mechanism of adjusting the enclosure volumes to change the audio frequency ranges to adjust the number, positions, audio frequency ranges and audio settings of the speakers based on the user's different usage demands for the portable electronic apparatus, so as to provide an audio with adaptively adjusted quality to meet the user's current usage demand.

Figure 3:
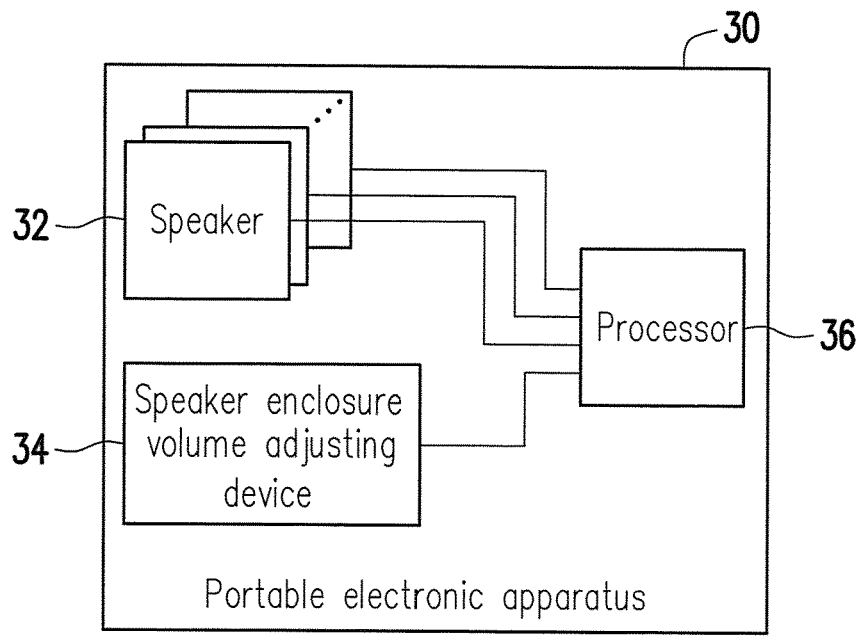
FIG. 3 is a block diagram illustrating a portable electronic device for adaptively adjusting a playback effect of speakers according to an embodiment of the present invention.

Specifically, FIG. 3 is a block diagram illustrating a portable electronic device for adaptively adjusting a playback effect of speakers according to an embodiment of the present invention. Referring to FIG. 3, a portable electronic apparatus 30 of the present embodiment is, for example, a notebook computer and includes a plurality of speakers 32, a speaker enclosure volume adjusting device 34 and a processor 36, and functions thereof are described below.

The speakers 32 are configured to play an audio output by the portable electronic apparatus 30, and include at least one tweeter, a woofer or various types of speakers having other audio frequency ranges which disposed in different positions. Therein, an enclosure volume of at least one of the speakers is adjustable, and through the adjustment of the enclosure volume, an audio frequency range of each speaker and even an overall audio frequency range covered by the speakers 32 may be changed.

The speaker enclosure volume adjusting device 34 includes elements, such as trails, latches, hooks, springs and elastic pieces disposed around the speakers 32 or integrated with the speakers 32 for the user to push or pull the speakers 32 having the adjustable enclosure volumes out of the portable electronic apparatus 30 by means of pushing or pulling, so as to expand the enclosure volume of the speaker 32. In an embodiment, the speaker enclosure volume adjusting device 34 also additionally includes elements, such as an electric motor, an oil hydraulic motor or a gear, such that the user may press a physical button on the portable electronic apparatus 30 or operate a software of the portable electronic apparatus 30 to drive the speakers 32 to be pushed from the body of the portable electronic apparatus 30, thereby, expanding the enclosure volumes of the speakers 32.

The processor 36 may be, for example, a central processing unit (CPU), a microprocessor, a digital signal processor (DSP), an application specific integrated circuits (ASIC) or the like and is coupled to the speakers 32 and the speaker enclosure volume adjusting device 34 to perform a method for adaptively adjusting a playback effect of the speakers of an embodiment of the invention.

Figure 4:
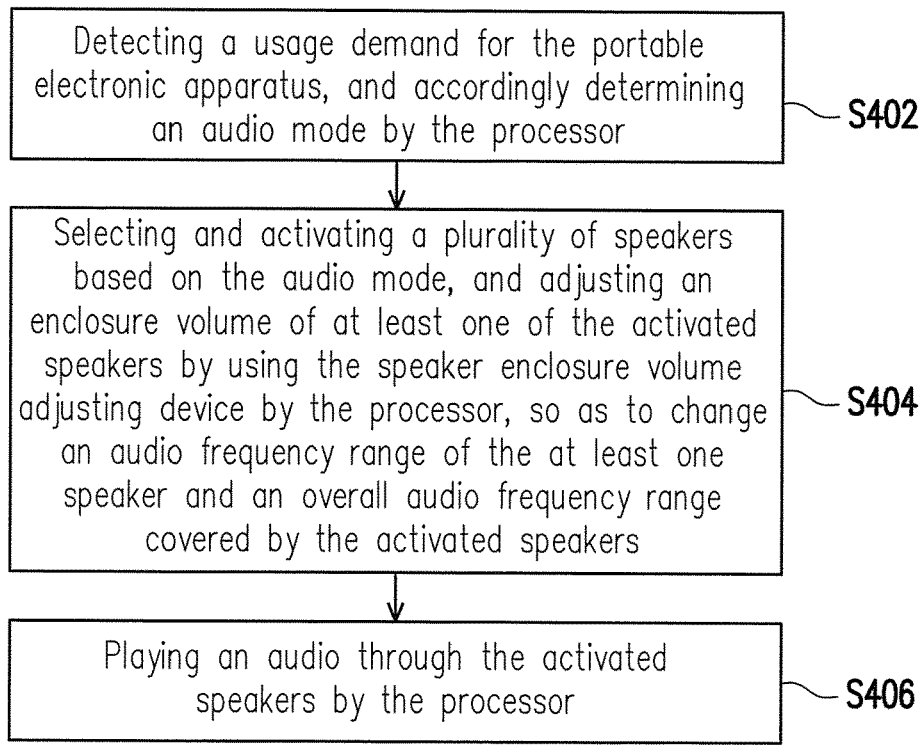
FIG. 4 is a flowchart illustrating a method for adaptively adjusting a playback effect of speakers according to an embodiment of the present invention.

Specifically, FIG. 4 is a flowchart illustrating a method for adaptively adjusting a playback effect of speakers according to an embodiment of the present invention. Referring to both FIG. 3 and FIG. 4, the method of the present embodiment is applicable to the portable electronic apparatus 30 illustrated in FIG. 3, and detailed steps of the method for adaptively adjusting the playback of the speakers of the present embodiment will be described with reference to each element of the portable electronic apparatus 30 depicted in FIG. 3.

First, the processor 36 detects a usage demand for the portable electronic apparatus 30, and accordingly determines an audio mode (step S402). The usage demand includes, for example, a function currently being executed by the portable electronic apparatus 30, a triggered function, or ambient surroundings.

In detail, in an embodiment, the portable electronic apparatus 30 may additionally include a control key disposed on a housing and configured to receive a user operation to generate a trigger signal, and the processor 36 may detect the trigger signal generated by the control key and accordingly determine the audio mode. In another embodiment, the portable electronic apparatus 30 may additionally include an audio receiver configured to detect ambient noise surrounding the portable electronic apparatus 30, and the processor 36 may determine the audio mode according to ambient noise detected by the audio receiver. In yet another embodiment, the processor 36 may directly detect a function, e.g., a voice call or a video playback, currently being executed by the portable electronic apparatus 30, and accordingly determine the audio mode. The previous embodiments are merely exemplarily described, but construe no limitations to the invention.

Then, based on the previously determined audio mode, the processor 36 selects and activates a plurality of the speakers 32, and adjusts an enclosure volume of at least one of the speakers, so as to change an audio frequency range of the at least one speaker and an overall audio frequency range covered by the activated speakers 32 (step S404). The activated speakers 32 include, for example, at least one tweeter and a woofer, and based on the determined audio mode, the processor 36 adjusts an enclosure volume of the tweeter to change an audio frequency range of the tweeter as well as an overall audio frequency range covered by the tweeter and the woofer in the meantime.

Figure 5:
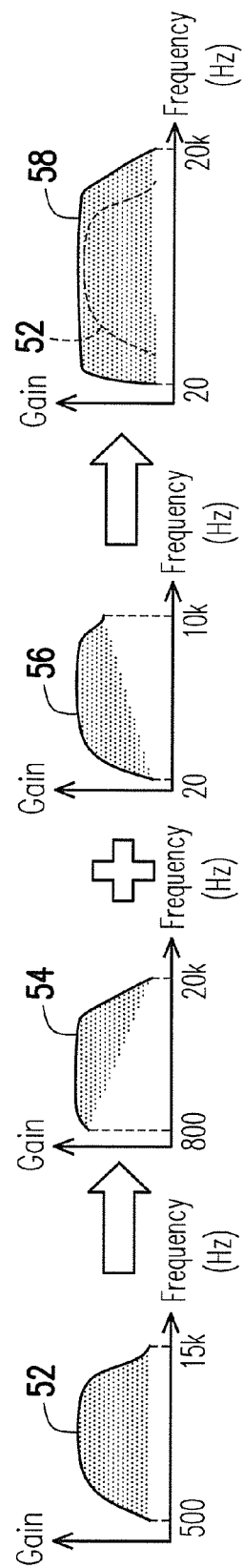
FIG. 5 illustrates an example of adjusting an enclosure volume to change an audio frequency range according to an embodiment of the invention.

For instance, FIG. 5 illustrates an example of adjusting an enclosure volume to change an audio frequency range according to an embodiment of the invention. With reference to FIG. 1, FIG. 2 and FIG. 5 simultaneously, the present embodiment is applicable to the image processing apparatus 10 depicted in FIG. 1 and FIG. 2. In the standard mode (as illustrated in FIG. 1), the portable electronic apparatus 10 merely activates two tweeters 14 and 16, each having an audio frequency range from 500 Hz to 15 k Hz, and a sum of the two audio frequency ranges provides an audio gain 52 as illustrated in FIG. 5. When the portable electronic apparatus 10 enters a game mode (as illustrated in FIG. 2), the tweeters 14 and 16 extends outward, such that the enclosure volumes thereof increase, and the audio frequency ranges are changed as from 800 Hz to 20 k Hz. The tweeters 14 and 16, due to the change of the audio frequency ranges thereof, are capable of additionally providing a high-frequency gain 54 as illustrated in FIG. 5. Additionally, in the game mode, the woofer 18 is also activated and capable of additionally providing an a low-frequency gain 56 having an audio frequency range from 20 Hz to 10 k Hz as illustrated in FIG. 5. In combination with the audio gain 52 originally provided by the tweeters 14 and 16, the entirety of the finally adjusted tweeters 14 and 16 and the woofer 18 is capable of providing an audio gain 58 as illustrated in FIG. 5, an overall audio frequency range covered thereby is also expanded to a range from 20 Hz to 20 k Hz, and thereby, a wider audio effect performance may be achieved.

Back to the process illustrated in FIG. 4, in the meantime of activating the speakers 32 and adjusting the audio frequency ranges thereof, the processor 36 plays an audio to be played by the portable electronic apparatus 30 through the activated speakers 32 (step S406). Therein, the processor 36, for example, applies an audio setting corresponding to the audio mode to the activated speakers 32, and accordingly plays the audio to be played by the portable electronic apparatus 30. Additionally, the audio setting includes settings, such as an equalizer, volume adjustment, vocal enhancement, noise reduction, a stereophonic simulation effect or a virtual surrounding sound effect, such that an audio effect played by the speakers 32 is optimized specific to a certain type of sound (e.g., rock, pop, dance, classical or soft).

By the method, the portable electronic apparatus 30 of the embodiments of the invention may adaptively adjust the audio frequency ranges and the audio effect of the speakers 32 based on the user's usage demand, and thereby, achieves audio performance most suitable for the current demand.

It should be mentioned that regarding the method for adaptively adjusting the playback effect of the speakers described above, the invention provides not only hardware control method directly driven by the processor (e.g., a DSP), but also a software control method performed through a basic input/output system (BIOS) or an audio driver, as well as a control method of triggering and adjusting through a mechanical operation. Exemplary embodiments are provided below for detailed description.

Figure 6:
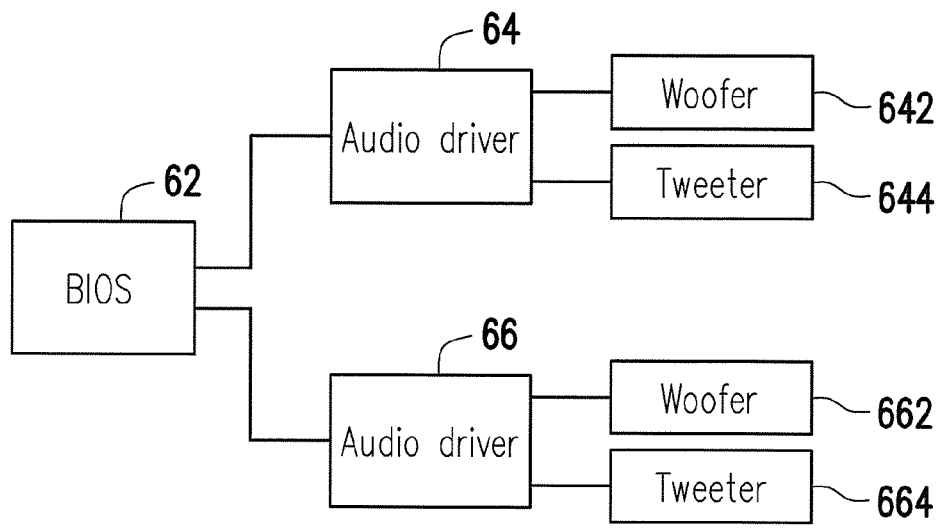
FIG. 6 illustrates an example of adaptively adjusting a playback effect of speakers according to an embodiment of the present invention.

FIG. 6 illustrates an example of adaptively adjusting a playback effect of speakers according to an embodiment of the present invention. Referring to FIG. 6, in the present embodiment, the processor of the portable electronic apparatus executes a BIOS 62, such that based on the determined audio mode, the processor selects a corresponding audio driver from audio drivers 64 and 66, and executes the selected audio driver through the BIOS 62 to activate the corresponding speakers through the audio driver. For example, if the audio mode corresponds to the audio driver 64, the processor selects and executes the audio driver 64, such that the audio driver 64 activates a woofer 642 and a tweeter 644 correspondingly connected therewith. If the audio mode corresponds to the audio driver 66, the processor selects and executes the audio driver 66, such that the audio driver 66 activates a woofer 662 and a tweeter 664 correspondingly connected therewith. Therein, the woofers 642 and 662 may be the same speaker or different speakers, and the tweeters 644 and 664 may also be the same speaker or different speakers, which are not limited in the invention.

Figure 7:
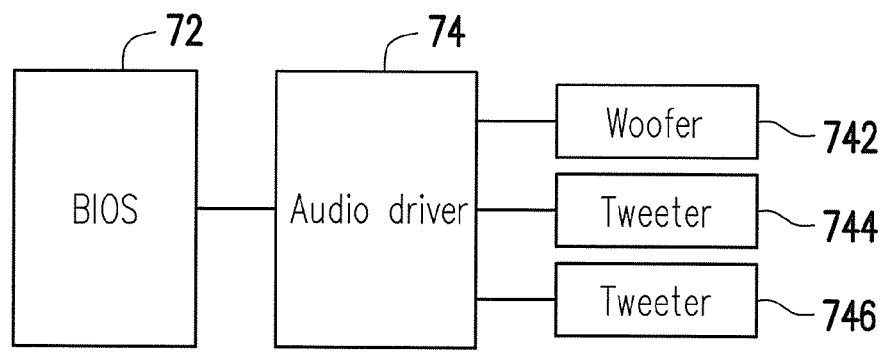
FIG. 7 illustrates an example of adaptively adjusting a playback effect of speakers according to an embodiment of the present invention.

FIG. 7 illustrates an example of adaptively adjusting a playback effect of speakers according to an embodiment of the present invention. Referring to FIG. 7, in the present embodiment, the processor of the portable electronic apparatus also executes a BIOS 72 in the same way, but the BIOS 72 is merely connected with an audio driver 74. Thus, based on the determined audio mode, the processor directly selects and activates speakers corresponding to the audio mode from a woofer 742 and tweeters 744 and 746 connected therewith through the audio driver 74. For example, only the tweeters 744 and 746 are activated, or alternatively, the three speakers 742, 744 and 746 are simultaneously activated.

Figure 8A:
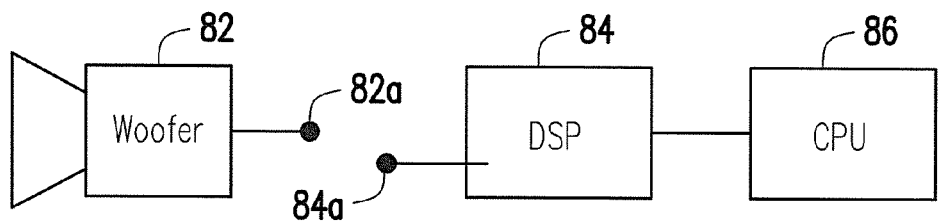
FIG. 8A illustrates an example of adaptively adjusting a playback effect of speakers according to an embodiment of the present invention.
Figure 8B:
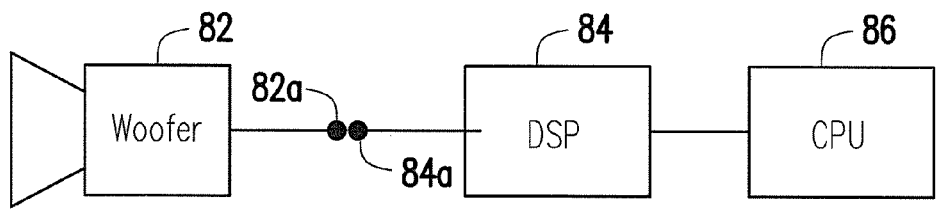
FIG. 8B illustrates an example of adaptively adjusting a playback effect of speakers according to an embodiment of the present invention.

FIG. 8A and FIG. 8B illustrate an example of adaptively adjusting a playback effect of speakers according to an embodiment of the present invention. Referring to FIG. 3 and FIG. 8A first, in the present embodiment, with the use of a control pin 82a disposed on a woofer 82, the processor 36 has a DSP 84 and a CPU 86 and detects the contacting of the control pin 82a by using a detection pin 84a (e.g., an output pin of a bass output channel) on the DSP 84. When the user adjusts an enclosure volume of the woofer 82 by using the speaker enclosure volume adjusting device described in the previous embodiment (e.g., by sliding out the woofer 82), and thereby enables the control pin 82a of the woofer to contact the detection pin 84a of the DSP 84, besides the woofer 82 is activated, the detection pin 84a of the DSP 84 generates and outputs a trigger signal to the DSP 84, the DSP 84 transmits the trigger signal to the CPU 86, the CPU 86 detects the trigger signal, and accordingly determines an audio mode, e.g., a heavy bass mode.

Based on the above, in the method and the portable electronic apparatus for adaptively adjusting the playback effect of the speakers, the audio mode most suitable for the current situation is determined by detecting the usage demand for the portable electronic apparatus, such that the speakers are selected and activated through the hardware control or the software control method. Moreover, the enclosure volume of each speaker is adjusted by means of a mechanical operation, so as to change the audio frequency range thereof, and the audio setting is applied by means of software setting, thereby achieving adaptively adjusting the playback effect of the speakers to meet the user's usage demands in different modes.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A method for adaptively adjusting a playback effect of speakers, applicable to a portable electronic apparatus having a plurality of speakers, wherein the portable electronic apparatus comprises a speaker enclosure volume adjusting device and a processor coupled to the speakers and the speaker enclosure volume adjusting device, the method comprising:

detecting a usage demand for the portable electronic apparatus, and accordingly determining an audio mode by the processor;

activating at least one tweeter and a woofer among the speakers, and adjusting an enclosure volume of the at least one tweeter by using the speaker enclosure volume adjusting device based on the audio mode by the processor, so as to change an audio frequency range of the at least one tweeter and an overall audio frequency range covered by the at least one tweeter and the woofer, wherein the enclosure volume of the at least one tweeter is expanded to increase the audio frequency range of the at least one tweeter; and applying an audio setting corresponding to the audio mode to the activated speakers, and playing an audio through the activated speakers by the processor.

2. The method according to claim 1, wherein the step of detecting the usage demand for the portable electronic apparatus, and accordingly determining the audio mode by the processor comprises:

detecting a trigger signal generated by a control key of the portable electronic apparatus in correspondence to an operation, and accordingly determining the audio mode by the processor.

3. The method according to claim 1, wherein the step of detecting the usage demand for the portable electronic apparatus, and accordingly determining the audio mode by the processor comprises:

detecting a function currently being executed by the portable electronic apparatus, and accordingly determining the audio mode by the processor.

4. The method according to claim 1, wherein the step of detecting the usage demand for the portable electronic apparatus, and accordingly determining the audio mode by the processor comprises:
  detecting ambient noise surrounding the portable electronic apparatus by using an audio receiver, and accordingly determining the audio mode by the processor.

5. The method according to claim 1, wherein the step of activating the at least one tweeter and the woofer among the speakers based on the audio mode comprises:
  executing a basic input/output system (BIOS), and executing a corresponding audio driver in the audio mode through the BIOS by the processor; and
  activating the corresponding speakers through the audio driver by the processor.

6. The method according to claim 1, wherein the step of activating the at least one tweeter and the woofer among the speakers based on the audio mode comprises:
  executing an audio driver to activate the corresponding speakers in the audio mode through the audio driver by the processor.

7. A portable electronic apparatus for adaptively adjusting a playback effect of speakers, comprising:
  a plurality of speakers, comprising at least one tweeter and a woofer and each of the speakers having an audio frequency range;
  a speaker enclosure volume adjusting device, adjusting an enclosure volume of at least one of the speakers, so as to change the audio frequency range of the at least one speaker; and
  a processor, coupled to the speakers and the speaker enclosure volume adjusting device, detecting a usage demand for the portable electronic apparatus to accordingly determine an audio mode, activating the at least one tweeter and the woofer and adjusting the enclosure volume of the at least one tweeter by using the speaker enclosure volume adjusting device based on the audio mode to change the audio frequency range of the at least one tweeter and an overall audio frequency range covered by the at least one tweeter and the woofer, applying an audio setting corresponding to the audio mode to the activated speakers, and playing an audio through the activated speakers,
  wherein the enclosure volume of the at least one tweeter is expanded to increase the audio frequency range of the at least one tweeter.

8. The portable electronic apparatus according to claim 7, further comprising:
  a control key, receiving an operation to generate a trigger signal, wherein the processor detects the trigger signal generated by the control key, and accordingly determines the audio mode.

9. The portable electronic apparatus according to claim 7, wherein the processor detects a function currently being executed by the portable electronic apparatus, and accordingly determines the audio mode.

10. The portable electronic apparatus according to claim 7, further comprising:
  an audio receiver, detecting ambient noise surrounding the portable electronic apparatus, wherein the processor determines the audio mode according to the ambient noise detected by the audio receiver.

11. The portable electronic apparatus according to claim 7, wherein the processor comprises a digital signal processor (DSP).

12. The portable electronic apparatus according to claim 7, wherein the processor executes a basic input/output system (BIOS), and executes a corresponding audio driver in the audio mode through the BIOS, so as to activate the corresponding speakers through the audio driver.

13. The portable electronic apparatus according to claim 7, wherein the processor executes the audio driver to activate the corresponding speakers in the audio mode through the audio driver.

14. The portable electronic apparatus according to claim 7, wherein one of the speakers has a control pin, and the processor has a detection pin corresponding thereto, wherein when the speaker enclosure volume adjusting device adjusts the enclosure volume of the at least one of the activated speakers to enable the control pin to contact the detection pin, the detection pin generates and outputs a trigger signal to the processor, and the processor detects the trigger signal and accordingly determines the audio mode.

* * * * *